US010607510B2

(12) United States Patent
Milbrandt et al.

(10) Patent No.: US 10,607,510 B2
(45) Date of Patent: Mar. 31, 2020

(54) ELASTIC BAND WITH EMBEDDED LABEL

(71) Applicant: Bedford Industries, Inc., Worthington, MN (US)

(72) Inventors: Jay A. Milbrandt, Worthington, MN (US); Derek Hanson, Valley Springs, SD (US); Jeffrey Scott Maltas, Sibley, IA (US)

(73) Assignee: Bedford Industries, Inc., Worthington, MN (US)

( * ) Notice: Subject to any disclaimer, the term of this patent is extended or adjusted under 35 U.S.C. 154(b) by 0 days.

(21) Appl. No.: 15/994,246

(22) Filed: May 31, 2018

(65) Prior Publication Data

US 2018/0350275 A1    Dec. 6, 2018

Related U.S. Application Data

(60) Provisional application No. 62/515,211, filed on Jun. 5, 2017.

(51) Int. Cl.
  *G09F 3/14*  (2006.01)
  *G09F 3/02*  (2006.01)
  (Continued)

(52) U.S. Cl.
  CPC .............. *G09F 3/14* (2013.01); *A44C 5/0084* (2013.01); *B29C 48/0022* (2019.02);
  (Continued)

(58) Field of Classification Search
  CPC ..... G09F 3/14; G09F 3/02; G09F 3/04; G09F 2003/0202; B29C 48/09; B29C 48/0022;
  (Continued)

(56) References Cited

U.S. PATENT DOCUMENTS 92,895 A    7/1869  Southworth
109,263 A   11/1870 Southworth
(Continued)

FOREIGN PATENT DOCUMENTS

AU    2011224038    11/2011
CN     1222092 A     7/1999
(Continued)

OTHER PUBLICATIONS

International Search Report and Written Opinion, dated Sep. 19, 2018, in Applicant's corresponding application No. PCT/US2018/035602 (15 pages).

*Primary Examiner* — Cassandra Davis
(74) *Attorney, Agent, or Firm* — Mai-Tram D. Lauer; Westman, Champlin & Koehler, P.A.

(57) ABSTRACT

A method for manufacturing a plurality of labeling bands includes extruding an elastic material, co-extruding a label material with the elastic material, curing the elastic material and the label material, and locating a plurality of demarcations at intervals along the length of the tube to define the plurality of labeling bands. Co-extruding the label material with the elastic material includes forming a tube having an outer surface, an inner surface and a length, so that the label material forms a stripe on the outer surface. In another aspect, an article of manufacture includes an endless band of a first elastic material and a label of a second material embedded into an outer surface of the endless band. The endless band includes the outer surface, an inner surface and first and second opposed perimeter edges, each of the first and second opposed perimeter edges having a common unstretched perimeter dimension.

7 Claims, 6 Drawing Sheets

(51) Int. Cl.

| | |
|---|---|
| *G09F 3/04* | (2006.01) |
| *B29C 48/00* | (2019.01) |
| *B29C 48/19* | (2019.01) |
| *B29C 48/20* | (2019.01) |
| *B65D 63/10* | (2006.01) |
| *B29C 48/91* | (2019.01) |
| *B29C 48/09* | (2019.01) |
| *A44C 5/00* | (2006.01) |

(52) U.S. Cl.
CPC .......... *B29C 48/0023* (2019.02); *B29C 48/09* (2019.02); *B29C 48/19* (2019.02); *B29C 48/20* (2019.02); *B29C 48/9105* (2019.02); *B65D 63/109* (2013.01); *G09F 3/02* (2013.01); *G09F 3/04* (2013.01); *G09F 2003/0202* (2013.01)

(58) Field of Classification Search
CPC ..... B29C 48/0023; B29C 48/19; B29C 48/20; B29C 48/9105; B65D 63/109; A44C 5/0084
See application file for complete search history.

(56) References Cited

U.S. PATENT DOCUMENTS

| | | | |
|---|---|---|---|
| 134,116 A | 12/1872 | West | |
| 161,145 A | 3/1875 | Moder | |
| 212,578 A | 2/1879 | Smith | |
| 224,958 A | 2/1880 | Rowland | |
| 263,600 A | 8/1882 | Searing | |
| 381,879 A | 4/1888 | Howard | |
| D28,619 S | 5/1898 | McFadden | |
| 1,221,572 A | 4/1917 | Morton | |
| 1,397,079 A | 11/1921 | Cohen | |
| 1,526,867 A * | 2/1925 | Peterson | A45C 13/185 24/3.5 |
| 1,830,410 A | 11/1931 | Schaaf | |
| 1,929,320 A | 10/1933 | Lulham | |
| 2,194,220 A | 3/1940 | Elder | |
| 2,194,898 A | 3/1940 | Hanford | |
| 2,316,149 A | 4/1943 | Bates | |
| 2,362,523 A | 11/1944 | Armstrong | |
| 2,516,292 A | 7/1950 | Bennett | |
| 2,516,929 A | 8/1950 | Van Ackeren | |
| 2,635,604 A | 4/1953 | Fredrickson | |
| 2,669,047 A | 2/1954 | Rieger | |
| 2,937,464 A | 5/1960 | Marshall | |
| 3,076,235 A | 2/1963 | Rollins | |
| 3,077,683 A | 2/1963 | Jones | |
| 3,164,250 A | 1/1965 | Paxton | |
| 3,545,795 A | 12/1970 | Hertel | |
| 3,602,957 A | 9/1971 | Chang | |
| 3,621,809 A | 11/1971 | Paxton | |
| 3,635,367 A | 1/1972 | Morita | |
| 3,662,480 A | 5/1972 | Gilson | |
| 3,744,658 A | 7/1973 | Fujio | |
| 3,749,622 A | 7/1973 | Sato | |
| 3,777,378 A | 12/1973 | Sant' Anselmo | |
| 3,783,083 A | 1/1974 | Jenkins | |
| 3,807,679 A | 4/1974 | Burke | |
| 3,843,438 A | 10/1974 | Gabriel | |
| 3,896,524 A | 7/1975 | Parker | |
| 3,930,506 A | 1/1976 | Overend | |
| 3,933,560 A | 1/1976 | Muttera | |
| 3,955,656 A | 5/1976 | Kashinksi | |
| 4,079,875 A | 3/1978 | Zodrow | |
| 4,098,636 A | 7/1978 | Gabriel | |
| 4,119,449 A | 10/1978 | Gould | |
| D251,121 S | 2/1979 | Smith | |
| 4,296,861 A | 10/1981 | Barrash | |
| 4,323,608 A | 4/1982 | Denny | |
| 4,341,303 A | 7/1982 | Britt | |
| 4,363,401 A | 12/1982 | Savagian | |
| 4,390,095 A | 6/1983 | Cunningham | |
| 4,407,082 A | 10/1983 | Stehouwer | |
| 4,412,624 A | 11/1983 | Tanaka | |
| 4,413,741 A | 11/1983 | Curchack | |
| 4,433,498 A | 2/1984 | Bienz | |
| 4,460,143 A | 7/1984 | Ohama | |
| 4,519,178 A | 5/1985 | Crabb | |
| 4,529,229 A | 7/1985 | Glibbery | |
| 4,540,619 A | 9/1985 | Watanabe | |
| 4,712,671 A | 12/1987 | Salacuse | |
| 4,725,468 A | 2/1988 | McIntyre | |
| 4,749,426 A | 6/1988 | Wyss | |
| 4,916,841 A | 4/1990 | Dawson | |
| 4,978,144 A | 12/1990 | Schmidt | |
| 5,018,286 A | 5/1991 | Zahner | |
| 5,087,306 A | 2/1992 | Cheung | |
| 5,113,757 A | 5/1992 | Spencer | |
| 5,131,614 A | 7/1992 | Garcia | |
| 5,207,746 A | 5/1993 | Jones | |
| D338,195 S | 8/1993 | Sugarman | |
| RE34,366 E | 9/1993 | Instance | |
| 5,248,164 A | 9/1993 | Lepretre | |
| 5,279,019 A | 1/1994 | Knickle | |
| 5,292,566 A | 3/1994 | Shacklett | |
| 5,322,724 A | 6/1994 | Levens | |
| 5,348,781 A | 9/1994 | Koblella | |
| 5,363,576 A | 11/1994 | Piana | |
| 5,367,752 A | 11/1994 | Petty | |
| 5,388,739 A | 2/1995 | Gargan | |
| 5,467,897 A | 11/1995 | Williams | |
| 5,490,658 A | 2/1996 | Coward | |
| 5,531,696 A | 7/1996 | Menes | |
| 5,617,656 A | 4/1997 | Ludlow | |
| D385,581 S | 10/1997 | Linz | |
| D386,211 S | 11/1997 | Taparauskas | |
| 5,683,194 A | 11/1997 | Emmel | |
| 5,697,177 A | 12/1997 | Ludlow | |
| 5,700,537 A | 12/1997 | Instance | |
| 5,713,467 A | 2/1998 | Kao | |
| 5,733,652 A | 3/1998 | Stowman | |
| 5,778,583 A | 7/1998 | Larsen | |
| 5,782,495 A | 7/1998 | Grosskopf | |
| 5,866,219 A | 2/1999 | McClure | |
| 6,024,225 A | 2/2000 | Van der Donk | |
| 6,036,234 A | 3/2000 | Chess | |
| 6,058,639 A | 5/2000 | Tinklenberg | |
| 6,076,669 A | 6/2000 | Ling | |
| 6,116,653 A | 9/2000 | Oberholzer | |
| 6,146,731 A | 11/2000 | Tanoto | |
| 6,270,834 B1 | 8/2001 | Burrows | |
| 6,271,631 B1 | 8/2001 | Burrows | |
| 6,279,255 B1 | 8/2001 | Larsen | |
| 6,355,403 B1 | 3/2002 | Bourdelais | |
| 6,378,700 B1 | 4/2002 | Tong | |
| 6,381,890 B1 | 5/2002 | Sjostedt | |
| 6,413,122 B2 | 7/2002 | Fujioka | |
| 6,449,886 B1 | 9/2002 | Gray | |
| 6,688,023 B1 | 2/2004 | Gwen | |
| 6,694,779 B1 * | 2/2004 | Dreger | A47G 21/16 63/15 |
| 6,701,532 B1 | 3/2004 | Glassberg | |
| 6,766,917 B1 | 7/2004 | Blewitt | |
| D494,066 S | 8/2004 | Liu | |
| 6,810,811 B2 | 11/2004 | Grounds | |
| D501,892 S | 2/2005 | Perry | |
| 6,991,261 B2 | 1/2006 | Dronzek | |
| 7,070,322 B1 * | 7/2006 | Field | A44C 5/0053 224/164 |
| 7,086,545 B2 | 8/2006 | Mannion | |
| D532,049 S | 11/2006 | Ludlow | |
| 7,281,345 B2 | 10/2007 | Ludlow | |
| 7,763,135 B1 | 7/2010 | Maltas | |
| 7,922,022 B2 | 4/2011 | Ciarrocchi | |
| 8,047,387 B2 | 11/2011 | Chalekian | |
| 8,635,795 B2 | 1/2014 | Ludlow | |
| 9,293,069 B2 | 3/2016 | Maltas | |
| 9,333,641 B2 * | 5/2016 | Macias | B25H 3/00 |
| 9,355,577 B1 | 5/2016 | Coleman | |
| 2003/0096076 A1 | 5/2003 | Allison | |

(56) References Cited

U.S. PATENT DOCUMENTS

| | | | |
|---|---|---|---|
| 2003/0150919 A1 | 8/2003 | Blank | |
| 2004/0028865 A1 | 2/2004 | Sellars | |
| 2005/0138854 A1 | 6/2005 | Simmons | |
| 2005/0166439 A1 | 8/2005 | Ludlow | |
| 2005/0173073 A1 | 8/2005 | Chernoff | |
| 2005/0255277 A1 | 11/2005 | Syron | |
| 2006/0086028 A1 | 4/2006 | Vaughan | |
| 2006/0147668 A1 | 7/2006 | Hirose | |
| 2006/0272185 A1 | 12/2006 | Malama | |
| 2007/0020423 A1 | 1/2007 | Chamandy | |
| 2008/0301853 A1* | 12/2008 | Cummiskey | A44C 5/0015 2/170 |
| 2009/0070919 A1* | 3/2009 | Kim | A41F 9/00 2/319 |
| 2010/0006587 A1 | 1/2010 | Newmark | |
| 2010/0035010 A9 | 2/2010 | Sellars | |
| 2010/0072794 A1 | 3/2010 | Karovic | |
| 2010/0139133 A1 | 6/2010 | Adams | |
| 2010/0291329 A1 | 11/2010 | Di Duca | |
| 2011/0254225 A1* | 10/2011 | Doherty | A44B 5/002 273/287 |
| 2012/0159988 A1 | 6/2012 | Baird | |
| 2013/0020367 A1* | 1/2013 | Buckley | A63B 57/353 224/584 |
| 2013/0055760 A1* | 3/2013 | Rush | A44C 5/003 63/1.14 |
| 2013/0180656 A1 | 7/2013 | Ghiam | |
| 2013/0219961 A1* | 8/2013 | Silver | A44C 9/0076 63/15.45 |
| 2014/0090418 A1* | 4/2014 | Mihalyo | A44C 5/0007 63/3 |
| 2015/0245690 A1* | 9/2015 | Fontan | A44C 9/00 63/15.2 |
| 2015/0359304 A1 | 12/2015 | Thomas | |
| 2016/0157006 A1* | 6/2016 | Bacino | H04R 1/1033 24/122.3 |
| 2016/0225292 A1 | 8/2016 | Maltas | |
| 2017/0231338 A1* | 8/2017 | Thomas | A44C 17/0216 63/1.12 |

FOREIGN PATENT DOCUMENTS

| | | | | |
|---|---|---|---|---|
| CN | 204632247 | | 9/2015 | |
| EP | 0326039 | | 8/1989 | |
| EP | 1136971 | | 9/2001 | |
| FR | 1453496 | A | 6/1966 | |
| FR | 2234976 | A1 | 1/1975 | |
| FR | 2634574 | | 1/1990 | |
| FR | 3010601 | | 3/2015 | |
| GB | 22813 | | 10/1902 | |
| GB | 451036 | | 7/1936 | |
| GB | 1333598 | A | 10/1973 | |
| GB | 2255985 | | 11/1992 | |
| GB | 2382810 | | 6/2003 | |
| GB | 2405854 | | 3/2005 | |
| GB | 2460890 | A | 12/2009 | |
| GB | 2491645 | A * | 12/2012 | G09F 3/005 |
| JP | 6182849 | A | 7/1994 | |
| NL | 1016806 | | 6/2002 | |
| WO | 9824086 | | 6/1998 | |
| WO | 2007084119 | | 7/2007 | |
| WO | 2014/036246 | | 3/2014 | |

\* cited by examiner

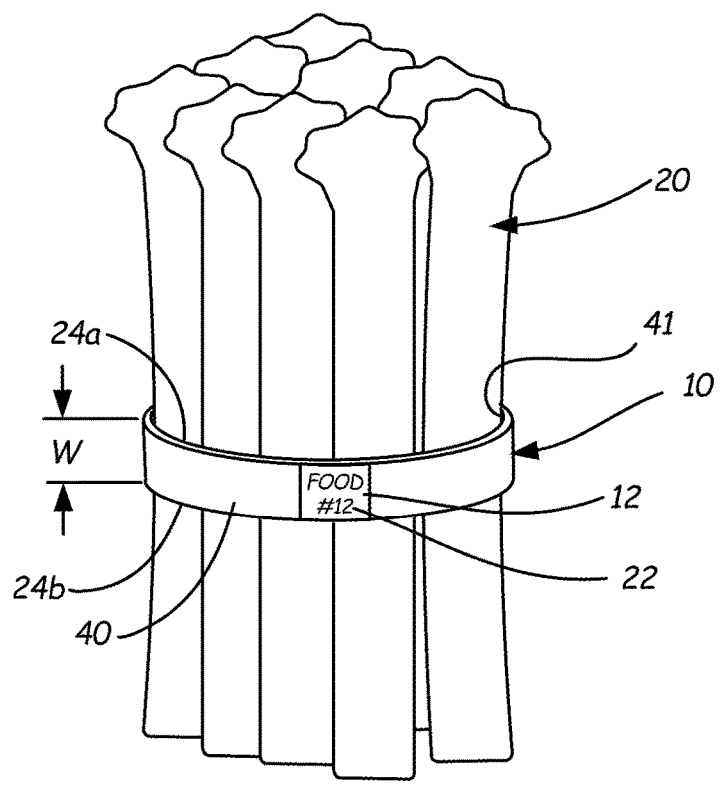
FIG. 1
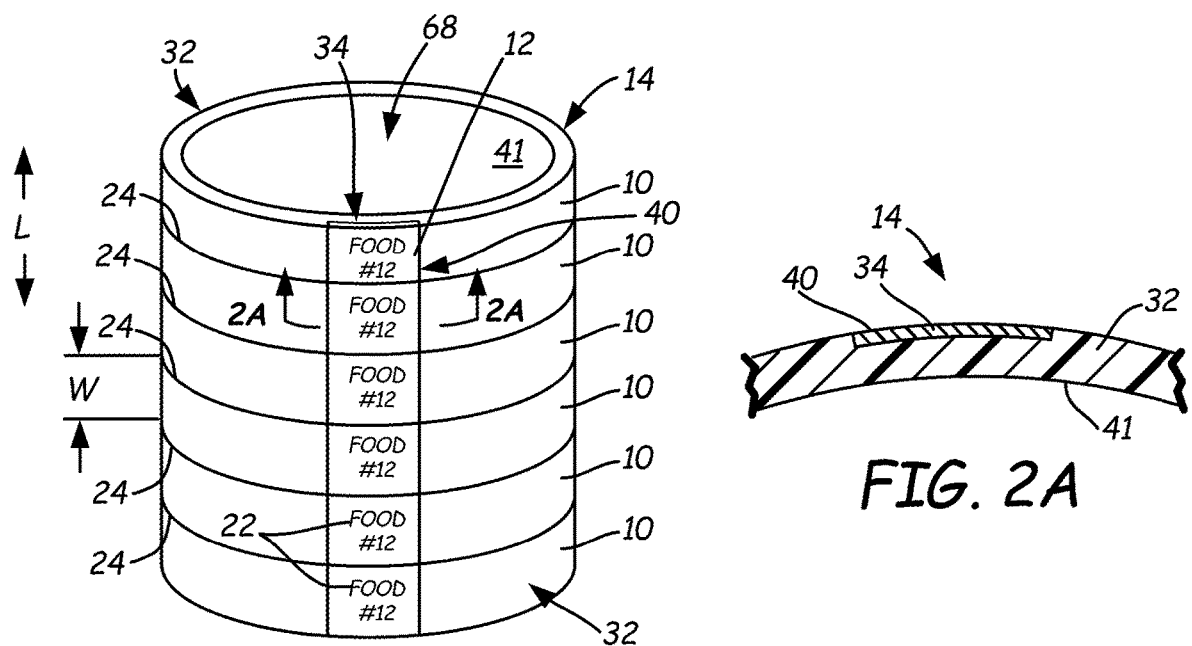
FIG. 2
FIG. 2A

ELASTIC BAND WITH EMBEDDED LABEL

CROSS-REFERENCE TO RELATED APPLICATION

This application claims the benefit of priority from U.S. Provisional Patent Application No. 62/515,211, filed Jun. 5, 2017; this priority application is hereby incorporated by reference in its entirety.

BACKGROUND

The prior art is replete with methods of merchandise labeling using bands about merchandise. Sometimes the heretofore known bands have elastic sections united to non-elastic sections, and sometimes they are endless elastic bands commonly called rubber bands.

For example, U.S. Pat. No. 2,516,292 (Bennett) of Jul. 25, 1950 teaches a preformed labeling article of elastic and non-elastic sections for holding bananas constantly under tension as they shrink. The ends of the elastic and non-elastic sections of the band are overlapped and adhesively or otherwise bonded together. U.S. Pat. No. 5,733,652 (Stowman et al.) of Mar. 31, 1998 discusses banding of merchandise by a technique involving in situ bonding of the ends of a strip of elastic material with or without an interposed separate strip of material that is not necessarily elastic. In situ bonding, however, involves carrying bonding equipment to the site where banding of merchandise is to be done (e.g., for bonds formed by heat sealing) or involves removing and disposing of a release liner at the site of banding (e.g., for bonds formed by using liner-protected contact or pressure-sensitive adhesive layers). Neither approach is ideal for field application of labels. Also, when either a preformed band of bonded sections or an in situ formed band of bonded sections is stretched about merchandise, it exerts a compressive force on the merchandise. Relatively strong bonds are needed to prevent bond separation under such circumstances since the bonds are in the line of stretching and are subjected to the tension of stretching during use. A still further problem is the questionable reliability of machine-readable codes on stretched bands encircling merchandise, such as UPC bar codes, for example.

Where endless bands of rubber (commonly called rubber bands) are used, as in teachings of U.S. Pat. No. 5,617,656 (Ludlow et al.); U.S. Pat. No. 5,697,177 (Ludlow et al.); and U.S. Pat. No. 6,058,639 (Tinklenberg), a second step arises for attaching a tag. The two-step approach is not the most efficient, although it has been one of the more popular approaches in the past because the tag is distinct from the rubber band and can carry reliable UPC bar coding that is easy to handle at checkout scanning.

A known merchandise marking article capable of single-step application to achieve simultaneous banding and scan-reliable bar-coding of merchandise is described in U.S. Pat. No. 5,778,583 (Larsen) of Jul. 14, 1998, where the tag is attached to the rubber band by encircling a section of the tag about the rubber band prior to the time the rubber band is fastened in banding condition about merchandise. However, economy is not a hallmark for the manufacture of this prior art article.

SUMMARY

In one aspect, a method for manufacturing a plurality of labeling bands includes extruding an elastic material, co-extruding a label material with the elastic material, curing the elastic material and the label material, and locating a plurality of demarcations at intervals along the length of the tube to define the plurality of labeling bands. Co-extruding the label material with the elastic material includes forming a tube having an outer surface, an inner surface and a length, so that the label material forms a stripe on the outer surface.

In another aspect, an article of manufacture includes an endless band of a first elastic material and a label of a second material embedded into an outer surface of the endless band. The endless band includes the outer surface, an inner surface and first and second opposed perimeter edges, each of the first and second opposed perimeter edges having a common unstretched perimeter dimension. A width dimension of the endless band between the first and second opposed perimeter edges is smaller than the unstretched perimeter dimension.

This disclosure, in its various combinations, either in method or article form, may also be characterized by the following listing of items:

1. A method for manufacturing a plurality of labeling bands including:
    extruding an elastic material;
    co-extruding a label material with the elastic material to form a tube having an outer surface, an inner surface and a length, so that the label material forms a stripe on the outer surface;
    curing the elastic material and the label material; and
    locating a plurality of demarcations at intervals along the length of the tube to define the plurality of labeling bands.
2. The method of item 1, further including providing indicia on the label material.
3. The method of item 2, wherein providing indicia includes printing.
4. The method of item 3, wherein printing includes activating a laser marking component of the label material.
5. The method of any of items 1-4, further including pulling upon the tube.
6. The method of any of items 1-5, further including severing the tube along the plurality of demarcations.
7. The method of any of items 1-6, wherein locating the plurality of demarcations includes forming a plurality of lines of weakness so that adjacent labeling bands remain rupturably connected.
8. The method of any of items 1-7, further including flattening the tube.
9. The method of item 8, further including winding the flattened tube into a spool.
10. The method of any of items 1-9, further including applying an adhesive to the stripe.
11. The method of item 10, further including applying a release liner to the adhesive.
12. The method of any of items 10-11, further including affixing a tag to the adhesive.
13. An article of manufacture including:
    an endless band of a first elastic material having an outer surface, an inner surface and first and second opposed perimeter edges, each of the first and second opposed perimeter edges having a common unstretched perimeter dimension, wherein a width dimension of the endless band between the first and second opposed perimeter edges is smaller than the unstretched perimeter dimension; and
    a label of a second material embedded into the outer surface of the endless band.
14. The article of item 13, wherein the label includes indicia on the outer surface.

15. The article of any of items 13-14, wherein the label occupies less than 25% of the outer surface.
16. The article of any of items 13-15, wherein the second material is more rigid than the first elastic material.
17. The article of any of items 13-16, wherein the second material is less elastic than the first elastic material.
18. The article of any of items 13-17, and further including a tag attached to the label.
19. The article of item 18, further including adhesive between the tag and the label.
20. The article of any of items 18-19, wherein the tag is larger than the label.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

FIG. 1 is a front perspective view of an exemplary embodiment of an elastomer band with an embedded label in an assembly with a bundled product.

FIG. 2 is a front perspective view of a tube of such elastic bands before they are separated into individual bands.

FIG. 2A is a cross-sectional view taken along line 2A-2A of FIG. 2.

Figure 3:
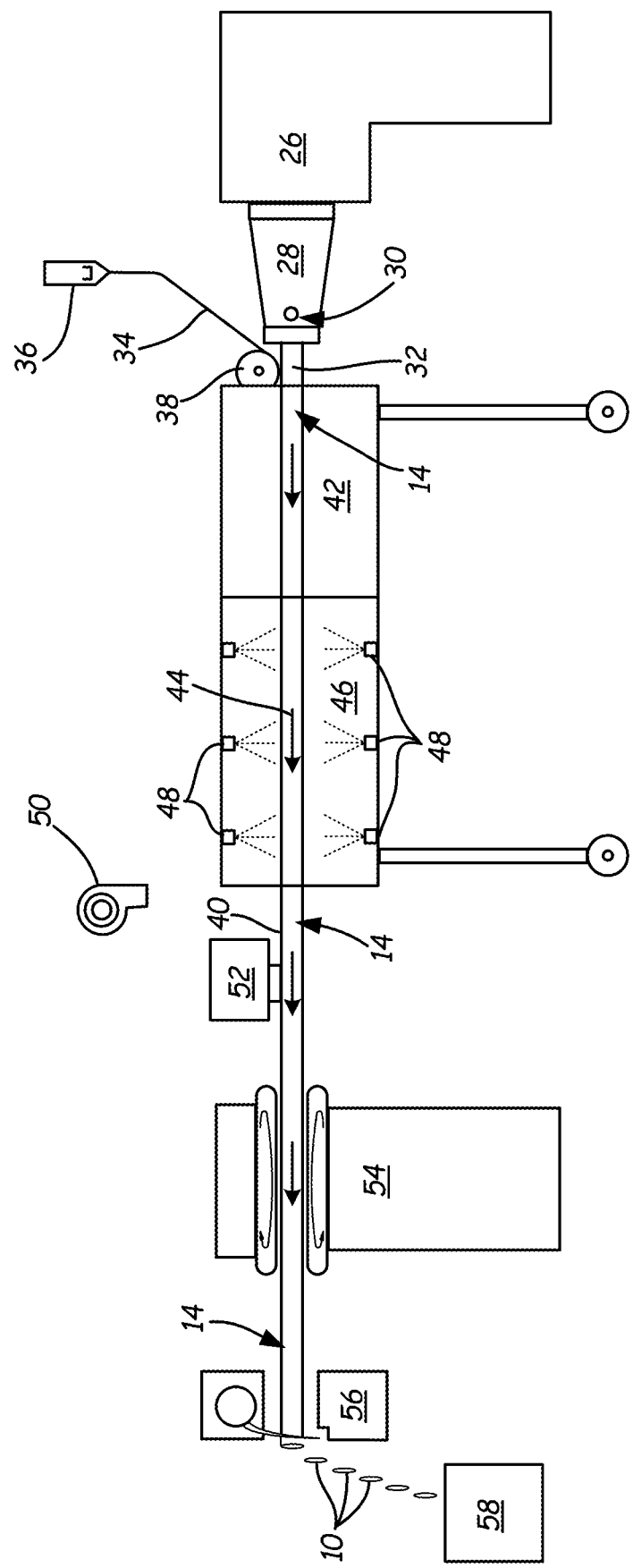
FIG. 3 is a side schematic view of an exemplary manufacturing line for producing the tube and bands of FIGS. 2 and 1, respectively.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

A one-step method using an economical, unitary product for reliable and simultaneous tagging and banding of merchandise, including for tagging and banding clumps of agricultural produce, is much desired.

FIG. 1 shows a labeling band 10 bundling a product 20, which in the illustrated case is a group of food items. Labeling band 10 may be made of a stretchable material such as rubber or elastomer, having a label 12 embedded into the elastic material during production of the labeling band 10. As shown in FIG. 1, elastic labeling band 10 serves not only to bundle the group of food items making up product 20, but also serves as an identification label by the provision of a display area on label 12 including indicia 22. Indicia 22 may include information and/or decoration readable by a human and/or a machine and can be provided by means including printing, embossing, and other known means.

As shown in FIG. 1, labeling band 10 in an exemplary embodiment is an endless band, in that it is fainted as an integral tube of material, formed by a method such as extrusion about an anvil, rather than as a strip of material that is wrapped and then somehow connected at its ends. This leads to advantages in that there is less risk of the band separating under tension forces experienced during application or use with product 20. A relatively narrow product 20 is illustrated so that the configuration of labeling band 10 is clearly shown; however, it is to be understood that in a contemplated assembly of labeling band 10 and product 20, labeling band 10 will be stretched under tension to snugly surround and hold product 20. By "band," this disclosure generally refers to a structure in which width W between opposed perimeter edges 24a and 24b is smaller than a perimeter dimension of at least one of the perimeter edges 24a and 24b. As shown in FIG. 2A, label 12 of tag or label material is embedded into outer surface 40 of the labeling band 10. As discussed below, in different embodiments, label 12 may be made from an elastic material or an inelastic material.

FIG. 2 shows an elastic tube 14 from which the individual bands 10 are cut. Tube 14 includes outer surface 40, inner surface 41, and a length along direction L. Label material for labels 12 forms a stripe 34 on the outer surface 40 extending along direction L. Demarcation lines 24 are defined between adjacent individual bands 10 at intervals along the length of tube 14. Demarcation lines 24 may include weakened, uncut or partially cut elastomer portions of tube 14 so that adjacent labeling bands 10 remain rupturably connected. Alternatively, the demarcation lines 24 may mark cuts that completely sever adjacent labeling bands 10. While demarcation lines 24 are illustrated as straight lines, it is contemplated that they may be differently shaped so that labeling bands 10 have shaped side edges. Suitable shapes include undulating curves, scalloped lines, and zig-zag lines, among others.

FIG. 3 is a schematic view of an exemplary manufacturing line by which the elastic tube 14 can be made as an extruded tube 32 with a strip 34 of labels 12. In an exemplary manufacturing process for the formation of labeling bands 10, an extruder 26 is configured to extrude thermoplastic elastomer material through die 28. In an exemplary manufacturing method, the thermoplastic elastomer enters the extruder 26 at a temperature of about 300° F. (about 150° C.) and is slowly heated to a temperature of about 400° F. (about 200° C.) at an entrance to die 28. In die 28, which is kept at a temperature of about 400° F. (about 200° C.), the elastomer material flows around an anvil, which imparts a tubular shape to the elastomer material. Air is injected into the center of the extruded tube 32 to maintain its cross sectional circular shape and to prevent the walls of the tube from touching each other during curing.

Figure 6:
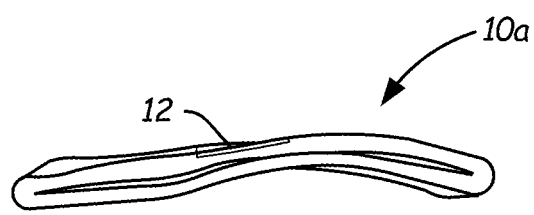
FIG. 6 is a side perspective view of a single flattened elastomer band.
Figure 7:
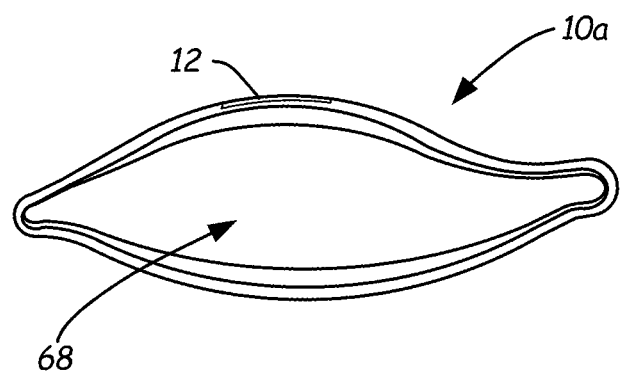
FIG. 7 is a perspective view of the band of FIG. 6 in an unflattened, or open configuration.
Figure 8:
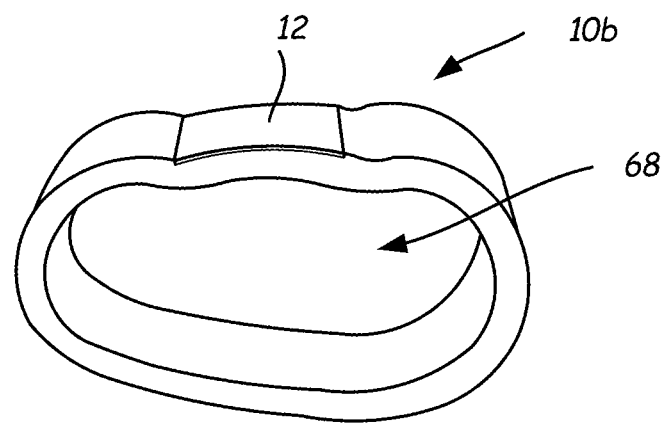
FIG. 8 is a perspective view of a second exemplary elastomer band of the present disclosure.
Figure 9:
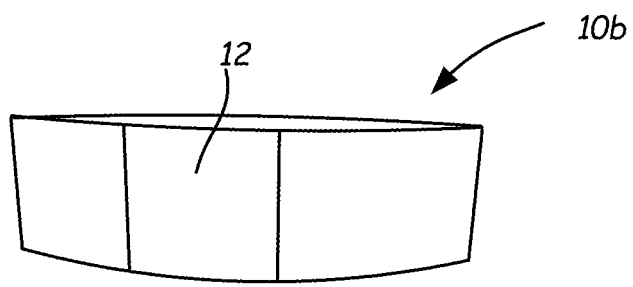
FIG. 9 is a front perspective view of the band of FIG. 8.

Differently sized and shaped dies 28 can be used to form labeling bands 10 of differing size and shape. For example, FIGS. 6 and 7 show a first exemplary labeling band 10*a* formed with a die 28 having an outside diameter of 1.910 inch (about 48 mm) and a wall of 0.040 inch (about 1 mm). As shown in FIGS. 8 and 9, another exemplary embodiment of labeling band 10*b* is formed using a die 28 with an outside diameter of 1.280 inch (about 32 mm) and a 0.035 inch wall (about 0.9 mm). In an exemplary process, thermoplastic elastomer material is extruded through die 28 at a rate of about 25 feet per minute. While particular values for process parameters such as temperatures, draw rates, dimensions, and materials are hereby described, it is contemplated that variations may be made in the choice of materials and process parameters to suit particular needs.

Examples of suitable materials for formation of labeling bands 10 include those recited for the flexible sheets or bands in Maltas et al., U.S. Pat. No. 7,763,135; Ludlow et al., U.S. Pat. No. 7,281,345; and Ludlow et al., International Application Publication No. WO 2007/084119. Each of the mentioned references is hereby incorporated by reference to the extent that it does not conflict with the present disclosure. In one embodiment, labeling bands 10 are each formed at least in part from biodegradable, degradable, or recyclable materials.

In some embodiments, suitable elastic materials for extruded tube 32 include thermoplastic elastomers that are at least heat softenable and even heat meltable to a flowable or moldable state. Suitable elastic materials include styrenic block co-polymers (e.g., styrene-butadiene styrene and styrene-ethylene-butylene styrene), olefinic elastomers (including those that are ethylene-based as well as those that are polypropylene-based), polyvinyl chloride-based elastomers, urethanes, nylon, silicon, rubber and the like. The elastic material(s) provide labeling bands 10 with sufficient elasticity to be stretched and to bounce back from a stretched condition.

In an exemplary embodiment, a co-extrusion material inlet 30 is provided to allow for co-extrusion of another material, such as a material having a different color or composition. In some embodiments, co-extrusion of a second material through inlet 30 results in an elastomeric tube 14 having a stripe (such as label strip 34 in an embodiment) of a different color compared to a color of the primary elastic material coming through extruder 26. In another embodiment, the co-extruded material being introduced through inlet 30 includes additives not provided in the material coming through extruder 26. A particularly suitable additive is a laser-marking polyethylene that allows the co-extruded strip to be easily laser printed after formation. In one embodiment, the additive is commercially available from RTP Company of Winona, Minn. under part no. LCX 111284Z. Such an additive can be added to a thermoplastic material introduced through inlet 30 at a concentration of about 2% in an exemplary embodiment. Other suitable additives include coloring, reflective, scented, and temperature-responsive ingredients, for example.

Extruded tube 32 emerges from die 28. In one embodiment, label strip 34 is provided from a supply 36 and pressed onto extruded tube 32 by roller 38. In an exemplary embodiment, supply 36 is a spool of label material provided as an elongated sheet or film wound upon itself and/or a core. In an exemplary embodiment, roller 38 is beveled to smoothly embed label strip 34 into extruded tube 32 so that an exterior surface 40 of label tube 14 is smooth, in that the exterior surface of label strip 34 is flush with the exterior surface of extruded tube 32 where label strip 34 is bonded to tube 32, as seen in FIG. 2A. Label strip 34 may be pre-printed with indicia 22, or such indicia 22 may be provided on the formed elastomer tube 14 at printer 52.

Label strip 34 may be derived from one or more paper, polymeric, metallic, organic, and/or fabric materials. Suitable materials for label strip 34 include those recited for the tag portions in Maltas et al., U.S. Pat. No. 7,763,135; Ludlow et al., U.S. Pat. No. 7,281,345; and Ludlow et al., International Application Publication No. WO 07/084119. For example, label strip 34 may be derived from one or more materials such as films of polyethylene terephthalate, polyethylene, polypropylene (e.g., oriented polypropylene), styrene, and combinations thereof. Label strip 34 in an exemplary embodiment is formed of materials such as those commercially available under the trade designation "TESLIN" from PPG Industries, Pittsburgh, Pa. In one embodiment, label strip 34 is formed at least in part from biodegradable, degradable, or recyclable materials. Label strip 34 may be opaque, translucent, or transparent.

Suitable polymers may be formulated so that printing inks are readily accepted on the surface of the sheet material. Polymers can also be treated with special surface treatments to enhance acceptance of printing inks. The exact structure and composition of suitable materials for label 12 can vary widely. Any of a variety of commercially available inks compatible with or accepted on a label strip 34 and retained thereon, and in any desired color, may be used to impart indicia 22 such as written information on label 12.

To increase impact resistance of label 12, a styrene-butadiene-styrene impact modifier can be useful in amounts up to about 40 percent of the weight of a polystyrene material. Tags 12 of such material are highly stable against stretching of the type that will damage scanability for bar codes. They have desired flexibility balanced by a slight stiffness that contributes to ease of handing during manufacture and use, including scanning of a machine-readable code at a check-out counter. Such tags 12 also can be reliably printed, especially when first subjected to a surface treatment such as, for example, a corona treatment such as available from Pillar Technologies of Hartland, Wis., a division of Illinois Tool Works. The treatment enhances wettability and adhesion characteristics of inks and adhesives on plastic substrates.

In the embodiment shown in FIG. 2, indicia 22 are disposed on a front side of label 12, in the form of human or machine readable indicia 22. Such indicia 22 may include product source identifying information, printing/cutting/processing registration marks, or bar code or other optical machine readable information. Indicia 22 may be printed or otherwise affixed thereto or formed thereon (e.g., Braille characters). Such information may take the form of an RFID inlay, tag, label or card, or a "smart label," such as one that monitors lapsed time, or bioactive paper or other material useful for destroying, deactivating and/or detecting undesirable pathogens. Additionally or alternatively, label 12 may bear indicia 22 printed with thermochromic ink, which is activated to change color or opacity due to changes in temperature (or ink that changes upon exposure to radiation). Further, labeling band 10 may bear (either on label 12 or within label 12 or otherwise on band 10) a scented substance.

In an exemplary embodiment, a sheet material for label 12 is sufficiently water resistant to not disintegrate and not significantly pucker, wrinkle, or otherwise disfigure or deform when placed in water. Moreover, in an exemplary embodiment, inks or other printing media used on label 12 are sufficiently water resistant to avoid disintegration or destruction when repeatedly subjected to water and washing operations (as is common for produce displays in supermarkets). A material for label 12 also should be somewhat tough in the sense of being sufficiently tear resistant to deter damage to it during banding, storage, transport and display, or by staff or customer handling.

In one embodiment, label 12 takes up an area of exterior surface 40 that is less than about 25% of the area of exterior surface 40. In an exemplary embodiment, label 12 is made of a substantially inextensible or non-stretchable material, while the remainder of labeling band 10 is made of a material that can stretch and return substantially to its unstretched configuration. Thus, labeling band 10 serves as flexible securing mechanism that extends (i.e., stretches) to accommodate the size or shape of a product 20 to which labeling band 10 is being affixed, and then, after release, can remain extended to some extent while engaged about that product 20. Labeling band 10 is primarily constructed of a material that is biased toward the non-extended position (e.g., an elastic material).

Labeling band 10 is most useful when applied to a product 20 that is larger than an inside diameter of opening 68 in its relaxed state. Those skilled in the art will appreciate that labeling bands 10 such as those described here can be constructed to accommodate items of any size. In other words, the size of opening 68 in its relaxed state can be selectively constructed to accommodate items of different sizes.

As discussed above, in one method, label strip 34 is pre-formed and pressed to extruded tube 32 as it emerges from extruder 26. In another method, label strip 34 is formed by co-extruding a label material introduced into die 28 through inlet 30. While the illustrations show a single label strip 34 on extruded tube 32, it is contemplated that multiple such label strips 34 can be provided on a single extruded tube 32.

With extruded tube 32 and label strip 34 joined together to form elastomer tube 14, the elastomer tube 14 advances to vacuum chamber 42. A vacuum provided in chamber 42 helps to maintain a consistent and accurate shape of the elastomer tube 14 as it cures. From there, elastomer tube 14 advances in process direction 44 to cooling chamber 46. In the illustrated embodiment, a plurality of misting nozzles 48 spray cooling fluid onto tube 14. In another embodiment, a cooling chamber could be provided in the form of a tank in which the tube 14 is submerged in a cooling fluid.

Upon its emergence from cooling chamber 46, elastomer tube 14 is dried. Such drying can be accomplished by exposure to atmospheric air. Additionally, an auxiliary blower or heater 50 can also be used to facilitate the drying process.

In an exemplary embodiment, printer 52 is provided for imparting indicia 22 on label strip 34 and/or another portion of elastomer tube 14. Printer 52 can be of any form desired for the particular application. For example, where label strip 34 is not pre-printed, a flexo printing process can be used at printer 52 to imprint indicia 22 upon label strip 34. In a case where label strip 34 is formed as a co-extruded stripe of material introduced at inlet 30, the label material may include a laser additive that allows for printing via the use of an infrared (IR) laser. Printer 52 may include an IR laser to activate the additive and facilitate the creation of an image and/or text on exterior surface 40 of elastomer tube 14.

In some embodiments, elastomer tube 14 is moved through the illustrated manufacturing process in the process direction 44 by puller 54. Thus, puller 54 helps maintain the motion of elastomer tube 14 through the process at the desired speed and controls the desired placement of, and tension on, elastomer tube 14.

Figure 4:
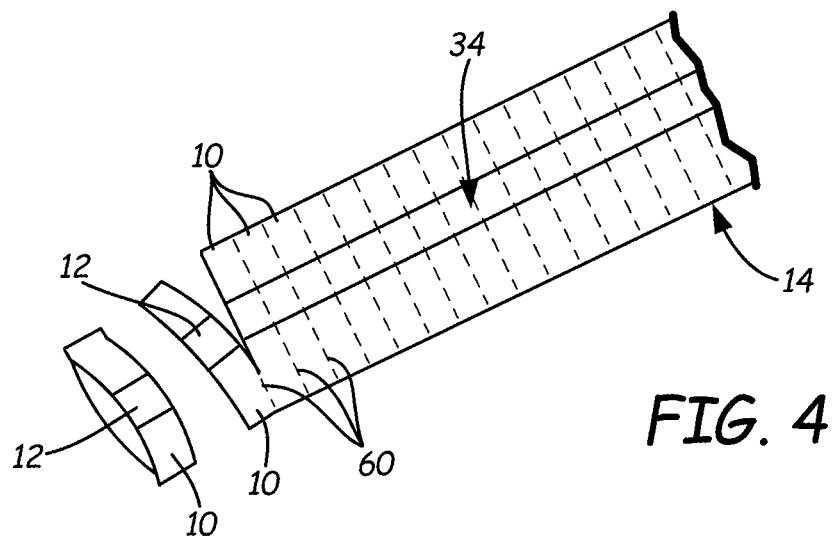
FIG. 4 is a perspective view of a flattened tube of rupturably connected elastomer bands.
Figure 5:
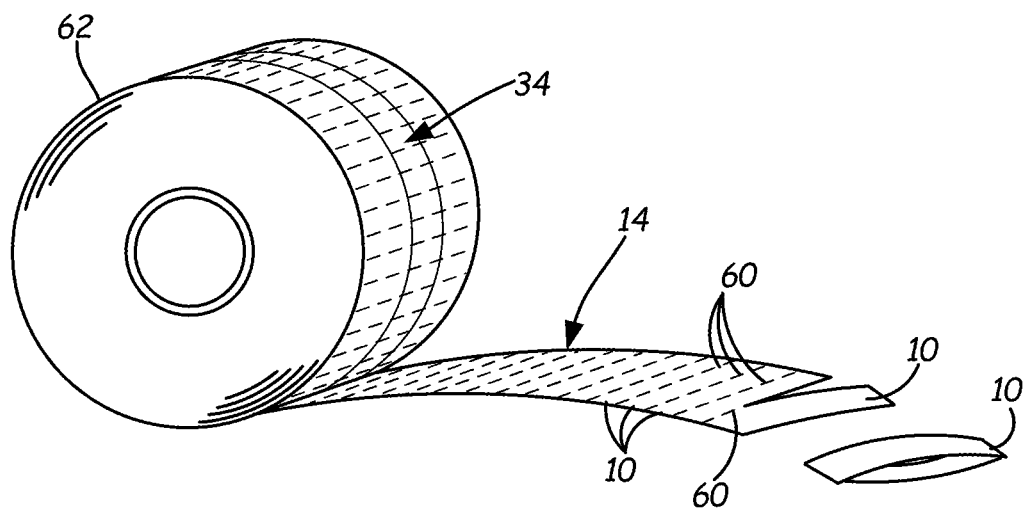
FIG. 5 is a perspective view of a roll of such connected elastomer bands.

In an exemplary embodiment, chopper 56 severs elastomeric tube 14 into individual labeling bands 10, which can fall into reservoir 58. Chopper 56 may cut band 14 by means including mechanical blades and/or laser cutters, for example. As shown in FIG. 2, chopper 56 may sever the individual bands 10 from tube 14 at evenly or unevenly spaced demarcation lines 24. In an exemplary embodiment, a width W of an individual band 10 between adjacent demarcation lines 24 is between about ⅛ inch (about 3 mm) and about inch (about 13 mm). However, it is contemplated that widths that are smaller than, and larger than, this range are also suitable. In FIG. 3, it is illustrated that chopper 56 completely separates the individual bands 10 from each other. However, as shown in FIGS. 4 and 5, a chopper 56 or other cutting or scoring device may instead leave rupturable connections between adjacent bands 10. As shown in FIG. 4, lines of weakness 60 are provided at demarcation lines 24 between individual bands 10 of elastomeric tube 14. As shown in FIG. 5, such rupturably connected bands 10 can be provided on a spool or roll 62 for individual detachment for use when desired.

As shown in FIGS. 4 and 5, elastic tube 14 may be laterally perforated or scored to define weakened separation lines 60 at demarcations 24 between adjacent elastic labeling bands 10 (both the tag strip 34 and elastomer tube 32 are perforated or scored). Thus, an individual elastic labeling band 10 may be severed from the tube 14 by tearing along a line of weakness 60. In FIG. 4, one discrete elastic labeling band 10 is shown as already separated from the tube 14, and one labeling band 10 is illustrated as in the process of being separated from the tube 14 along its respective line of weakness 60.

An alternative elastic labeling band distribution configuration is shown in FIG. 5. Here, the elastic tube 14 of connected labeling bands 10 is flattened and wound into spool 62, allowing for individual elastic labeling bands 10 to be torn off of the spool 62 as desired at lines of weakness 60. In FIG. 5, one discrete labeling band 10 is shown as having already been separated from the spool 62, while another labeling band 10 is shown in the process of being separated from the spool 62 via its respective line of weakness 60.

Line of weakness 60 is provided as perforations, scores, or cuts at least at a partial depth through a wall of elastic tube 14 (such a wall defined between outer surface 40 and inner surface 41, labeled in FIG. 2). Considerations affecting the size and depths of cuts forming lines of weakness 60 include their aesthetic presentation and how easily and cleanly individual bands 10 are removable (e.g., by tearing along line of weakness 60) from tube 14, balanced by the desirability to prevent unintentional separation of the bands 10 from the tube 14 prematurely.

FIGS. 6 and 7 show an embodiment of a band 10*a* that is provided in a form that is relatively easily flattened and is therefore particularly suitable for the rupturably connected versions shown in FIGS. 4 and 5. In contrast, FIGS. 8 and 9 show an embodiment in which band 10*b* has a thicker wall between its inside and outside surfaces 41, 40 compared to its perimeter length. While terms such as diameter and circumference may be used in this description, it is to be understood that the bands and tubes described herein need not be circular.

Figures 10, 11:
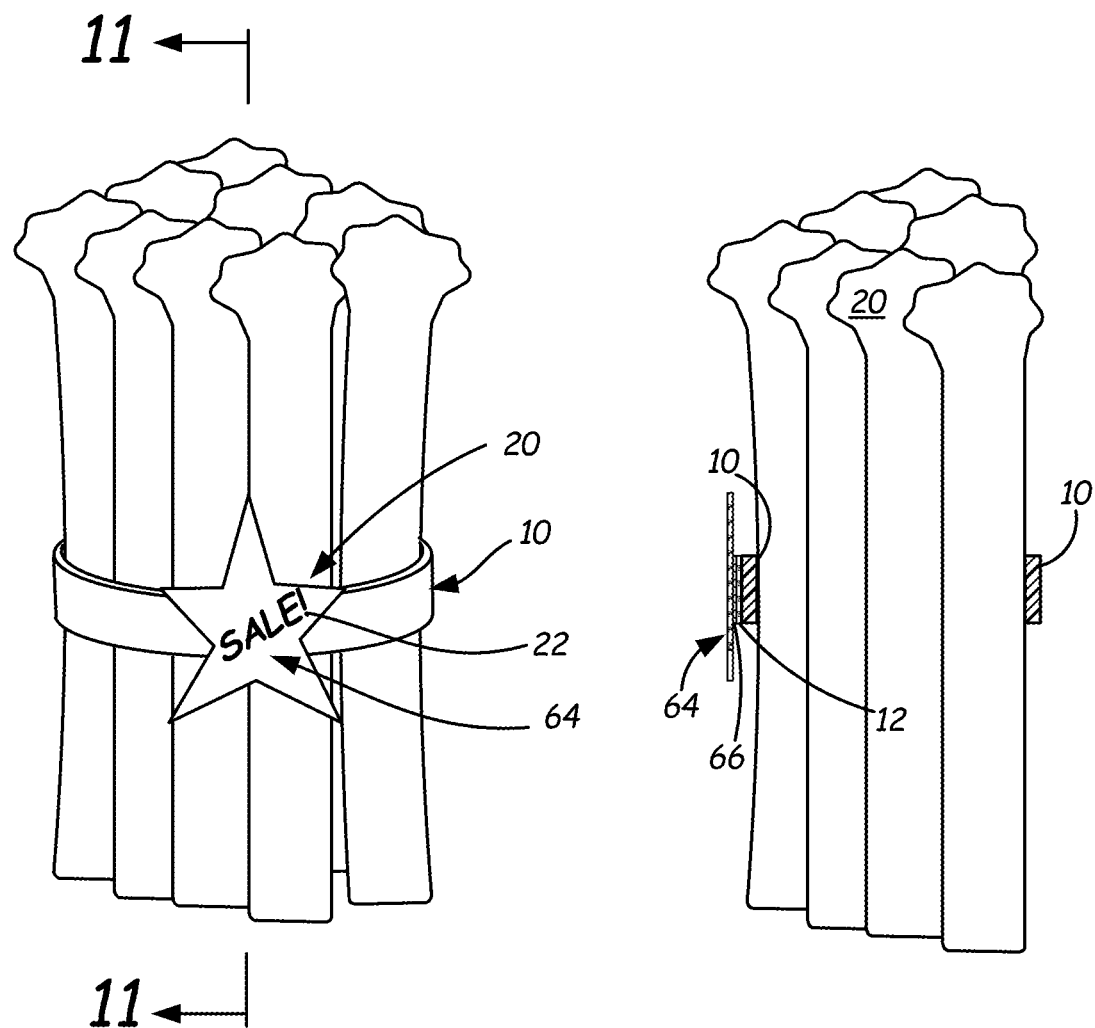
FIG. 10 is a front perspective view of an assembly including a third exemplary embodiment of an elastomer band.
FIG. 11 is a side view of the assembly of FIG. 10, taken along line 11-11 of FIG. 10.

In some embodiments, label 12 serves as a substrate on which another tag 64 may be provided, such as by attachment via adhesive 66, as shown in FIGS. 10 and 11. Tag 64 may be provided with indicia 22 thereon. Moreover, tag 64 can be provided in a wide variety of shapes, sizes and materials. In comparison, label 12 is most suited to materials that easily bond with the elastic material of extruded tube 32 during the process of formation illustrated in FIG. 3. For labeling band 10, the bond strength between label strip 34 and extruded tube 32 is preferably sufficient to maintain the bond when elastic band 10 is placed in tension in use (such as, for example, as seen in FIG. 1). Thus, the materials for label strip 34 and extruded tube 32 are selected for compatible bonding, or a suitable adhesive is used to bond them together. Moreover, the size and placement of label 12 is similarly limited by process requirements in some embodiments. However, a separately formed tag 64 is not limited in size and is larger than label 12 in the illustrated embodiment.

The material for label strip 34 is typically much thinner than that of the tube 32. However, the material of label strip 34 can be more rigid than that of tube 32. Such rigidity is particularly suitable for the uses illustrated in FIGS. 10 and 11, where tag 64 is attached to label 12. In such an embodiment, a particularly suitable material for label 12 is polypropylene. A relatively rigid label 12 facilitates the secure attachment of tag 64 because excessive bending of the attached portions of tag 64 and label 12 could weaken their attachment. In one embodiment, for attachment of tag 64 to label 12, adhesive 66 is applied to the stripe of adjacent labels 12; however, it is contemplated that other forms of attachment can be used between tag 64 and label 12 including, for example, ultrasonic welding and heat.

Because tag 64 can be formed of practically any material, the ability to provide indicia 22 of different forms is similarly unlimited. For example, tag 64 could be provided with indicia in the form of high end graphics, holograms, human and/or machine readable codes, and information providing radio frequency identification (RFID) or near field communication (NFC) functions, for example. In other embodiments, tag 64 may include materials that are receptive to special ways for imparting indicia 22 thereon, such as a tag 64 made of wood with burned markings 22 thereon or a tag 64 made of a textile with embroidered designs 22 thereon, for example.

It is contemplated that many different articles can be used as the "tag." The tag 64 need not be a simple card bearing display information (such as human or machine-readable indicia). Rather, the tag 64 may consist of, hold, contain, or be attached to a product sample, coupon, or other promotional item, for example. Such specialty tags may be configured as envelopes, booklets, sachets, folded members, rolled members, looped holders, and sealed packets, for example. Other specialty tags may even have three-dimensional characteristics, such as artificial flowers, bows, figurines and the like. Tag 64 may broadly present matter by emitting sound, fragrance, light, and other properties.

Moreover, tag 64 may be customized, such as for a particular product, company or event. Such custom tags 64 can be printed by the consumer, which allows for flexibility in content and production. For example, custom tags 64 can be produced on demand in small batches using a personal printer. Moreover, in cases in which label 12 is secured to the tag 34 by adhesive layer 66, a wide range of materials can be used for the tag 34, such as textiles, metals, and wood, for example. Tag 64 may also be specially shaped, having outlines corresponding to company logos, whimsical motifs, seasonal and holiday symbols, and other shapes, for example.

While not shown, it is to be understood that adhesive layer 66 may be covered with a release liner applied thereto (such as in the same location as the illustrated tag 64) to protect the adhesive layer 66 until its exposure is desired for affixation of a separate tag 64. The release liner may be fabricated from a paper and/or polymeric web (e.g., a polyolefin and/or polyethylene terephthalate web) coated with one or more release agents (e.g., a silicone release coating).

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

What is claimed is:

1. An article of manufacture including:
   an endless band of a first elastic material having an outer surface, an inner surface and first and second opposed perimeter edges, each of the first and second opposed perimeter edges having a common unstretched perimeter dimension, wherein a width dimension of the endless band between the first and second opposed perimeter edges is smaller than the unstretched perimeter dimension;
   a label of a second material embedded into the outer surface of the endless band, wherein an exterior surface of the label is flush with the outer surface of the endless band;
   a tag attached to the label; and
   adhesive between the tag and the label.

2. The article of claim 1, wherein the tag is larger than the label.

3. The article of claim 1, wherein the tag is positioned on the exterior surface of the label, and wherein a portion of the tag extends over the outer surface of the endless band.

4. The article of claim 1, wherein the second material is more rigid than the first elastic material.

5. The article of claim 1, wherein the second material is less elastic than the first elastic material.

6. The article of claim 1, wherein the tag includes indicia thereon.

7. The article of claim 1, wherein the tag has a different shape than the label.

* * * * *